United States Patent

Köhler et al.

Patent Number: 5,706,074
Date of Patent: Jan. 6, 1998

[54] MOTION PICTURE CAMERA

[75] Inventors: Hanns Köhler; Michael Koppetz, both of München; Hans-Dieter Jacoby, Vaterstetten, all of Germany

[73] Assignee: Arnold & Richter Cine Technik GmbH & Co. Betriebs KG, Munich, Germany

[21] Appl. No.: 562,672

[22] Filed: Nov. 27, 1995

[30] Foreign Application Priority Data

Nov. 25, 1994 [DE] Germany .................. 44 43 255.0

[51] Int. Cl.$^6$ .................................................. G03B 31/00
[52] U.S. Cl. .................................................. 352/35
[58] Field of Search .................... 352/34, 35, 139, 352/140

[56] References Cited

U.S. PATENT DOCUMENTS

| | | | |
|---|---|---|---|
| 2,180,683 | 11/1939 | Laube et al. | 352/35 |
| 3,459,473 | 8/1969 | Call | 352/140 |
| 3,606,233 | 9/1971 | Scharton et al. | 248/358 |
| 4,121,886 | 10/1978 | Gottschalk | 352/35 |
| 4,174,157 | 11/1979 | Gottschalk | 352/35 |
| 4,536,066 | 8/1985 | Bauer | 352/35 |
| 4,913,409 | 4/1990 | Doi et al. | 267/140.1 |
| 5,456,341 | 10/1995 | Garnjost et al. | 188/378 |

FOREIGN PATENT DOCUMENTS

| | | | |
|---|---|---|---|
| 0475544 | 3/1992 | European Pat. Off. | G03B 17/10 |
| 3049150 | 9/1981 | Germany | G03B 17/10 |
| 8620783 | 7/1989 | Germany | G03B 17/10 |

*Primary Examiner*—Safet Metjahic
*Assistant Examiner*—Christopher Mahoney
*Attorney, Agent, or Firm*—Christie, Parker & Hale, LLP

[57] ABSTRACT

A motion picture camera with an inner camera which has a camera mechanism that generates noise, a camera housing which has a lens carrier on which a photographic lens is disposed in the optical axis of the motion picture camera, and a plurality of noise-insulating connection elements disposed between the inner camera and camera housing. At least one of the noise-insulating connection elements is disposed parallel to the optical axis of the motion picture camera and has a higher rigidity relative to lower-frequency forces and a lower rigidity relative to higher-frequency forces.

28 Claims, 4 Drawing Sheets

MOTION PICTURE CAMERA

BACKGROUND OF THE INVENTION

This invention relates to motion picture cameras.

Noise-reducing motion picture cameras consists essentially of two major structural components: first, an external camera housing with a lens mount to accommodate an interchangeable photographic optical system and secondly, a camera skeleton or the inner camera, which has all the motor and drive devices necessary for the transport of a motion picture film from a feed spool to a take-up spool. The camera skeleton is generally equipped with a gate, a movable diaphragm, and a ground glass.

During operation of the motion picture camera, the movable devices of the inner camera generate mechanical vibrations and noise which are transferred to the external camera housing. Since these vibrations cannot be eliminated in the inner camera itself, they must be reduced to a minimum and their transfer to the external camera housing must be prevented.

For noise and vibration insulation of motion picture cameras, dampening elements made of elastomeric materials in various embodiments and arrangements, with which the inner camera is linked to the external housing, are provided. In the process, it must be assured that the flange focal length, which corresponds to the distance between the lens plane defined on the external housing and the image plane defined on the inner camera, is constant, in order to exclude out-of-focus and/or drifting images. The properties of the dampening elements determine the amount of noise reduction obtainable and the stability of the flange focal length between the lens mount connected with the camera housing and the gate connected with the inner camera.

Dampening elements with high rigidity have relatively high stability and thus assure maintenance of a constant flange focal length. Their ability to insulate noise and vibration is however, not very good. In contrast, dampening elements with low rigidity assure low noise and vibration transfer, but their low mechanical stability demands supplemental devices to guarantee nearly constant flange focal length. Frequent readjustment is thus unavoidable. In particular with more or less sudden movements of the motion picture camera, such as with pans or traveling shots, there are changes in the predefined flange focal length which result in out-of-focus and/or drifting images.

From DE 30 49 150 C2, a noise insulated camera is known which has a readjustment device compensating for a change in position of the inner camera relative to the external camera housing. The readjustment device consists of a two-armed lever, which is mounted at a center of rotation in a connection part linked with the external camera housing, while one arm of the lever is attached rotatably to the inner camera and the other arm can be acted on by a readjustment force acting to change the position of the inner camera.

Using such supplemental devices designed as compensation devices, of course, changes in position of the inner camera relative to the lens mount can be largely compensated; however, even this device cannot prevent shifts in flange focal length from occurring suddenly. Moreover, such a compensation device is relatively expensive and takes additional space in the camera.

From U.S. Pat. No. 4,174,157, a noise and vibration absorbing mounting of the inner camera relative to the external camera housing using dampening elements is known. The sound absorbing dampening elements have a male-threaded pin which can be screwed into the camera housing. The pin is accommodated by a female-threaded sleeve, between a male-threaded bearing bushing in which an elastomeric insert is provided. If after the loosening of the male-threaded pin, the male-threaded bearing bush is twisted inside the female-threaded sleeve, a lateral alignment of the inner camera and of the movable camera parts relative to the camera housing and thus relative to the lens mount is possible.

From U.S. Pat. No. 4,121,886, a solution for noise and vibration dampening of motion picture cameras is known whereby the assemblies causing noise are disposed on a mounting plate, which is not in direct contact with the external camera housing, but rather is linked with the external camera housing by dampening elements, while the external housing itself is designed double walled and sound insulated.

The disadvantage of both solutions consists primarily in that constant readjustment of the sound-absorbing connection elements is necessary to assure the correct flange focal length between the lens plane and the image plane. The image drift and loss of focus resulting in reduced picture quality covered by the changes in the flange focal length with panning movements of the motion picture are not avoided.

From DE-U-86 20 783, a motion picture camera is known, whereby for suppression of the structurally transmitted noise, connection elements to dampen the structurally transmitted noise are provided, which through a combination of differing hard (stops made of methyl methacrylate) and soft (rubber-like intermediate layers) materials constitute a compromise between the dampening of structurally transmitted noise and the necessary maintenance of the dimensional stability of the flange focal length. By distorting the rubber-like intermediate layers, the desired degree of dimensional stability is adjusted. Thus, the arrangement known from this prior art publication with connection elements made up of different materials provides improved dampening with largely constant flange focal length.

From EP 0 475 544 A1, an arrangement for noise insulation of motion picture cameras is known, whereby the sound-proofing support of the camera skeleton occurs in the camera housing by means of sound-insulating connection elements which have a direction-dependent inherent rigidity with higher rigidity in a direction perpendicular to the image plane of the inner camera as well as with less rigidity in a plane parallel to the image plane. With this direction-dependent inherent rigidity, the flexible suspension of the inner camera in the camera housing required for sound insulation is provided and the firm rigidity of the connection elements necessary for maintenance of constant flange focal length in the plane perpendicular to the flange focal length is maintained. By additional measures, such as arrangement of the connection elements with direction-dependent inherent rigidity between the front of the inner camera and the front of the camera housing and one connection element between the back of the inner camera and the camera housing, which, with high elasticity, exerts great initial stressing force between the inner camera and the camera housing, the noise-insulating effect can be optimized with simultaneous constant flange focal length.

Thus, it is desirable to provide a motion picture camera of the type mentioned in the introduction whereby the noise and vibration insulation between the inner and the outer camera, i.e., the camera housing, is further improved and constant flange focal length between the lens plane and the image plane is assured without necessary readjustment or the use of supplemental position-compensating devices.

SUMMARY OF THE INVENTION

There is provided in one embodiment of the invention a motion picture camera comprising an inner camera with a camera mechanism for operating the inner camera. Both the inner camera and the camera mechanism are housed inside a camera housing. The camera housing is linked to the inner camera by a noise-insulating connection that is parallel to the optical axis of the camera.

In a preferred embodiment, the noise insulating connection is active, and it responds rigidly to inertial and gravity forces which occur at low frequencies, but responds with flexibility to high frequency forces such as those generated by the camera mechanism. This is accomplished with a control circuit that determines how the noise insulating connection must change in length to prohibit transmitting the noise and vibration from the camera mechanism to the camera housing. Sensors measure the forces on the inner camera, and a filter removes the forces due to gravity or inertia. A processor then determines the necessary action of the noise-insulating connection. The noise insulating connection includes a converter element capable of changing length to compensate for the vibrations from the camera mechanism. The connection also includes a spring in parallel with the converter element.

In an alternate embodiment, the camera housing comprises a primary housing and a carrier plate. The lens is mounted onto the carrier plate. The carrier plate is linked to the primary housing by a plurality of soft elastic connection elements, and the inner camera is linked to the primary camera housing with soft elastic connection elements. A noise-insulating connection is interposed between the inner camera and the carrier plate to control the focal length and prohibit the transmission of vibration and noise from the inner camera to the primary housing and the carrier plate.

These and other features and advantages of the present invention will appear from the following Detailed Description and the accompanying drawings in which similar reference characters denote similar elements throughout the several views.

DETAILED DESCRIPTION

Figure 1:
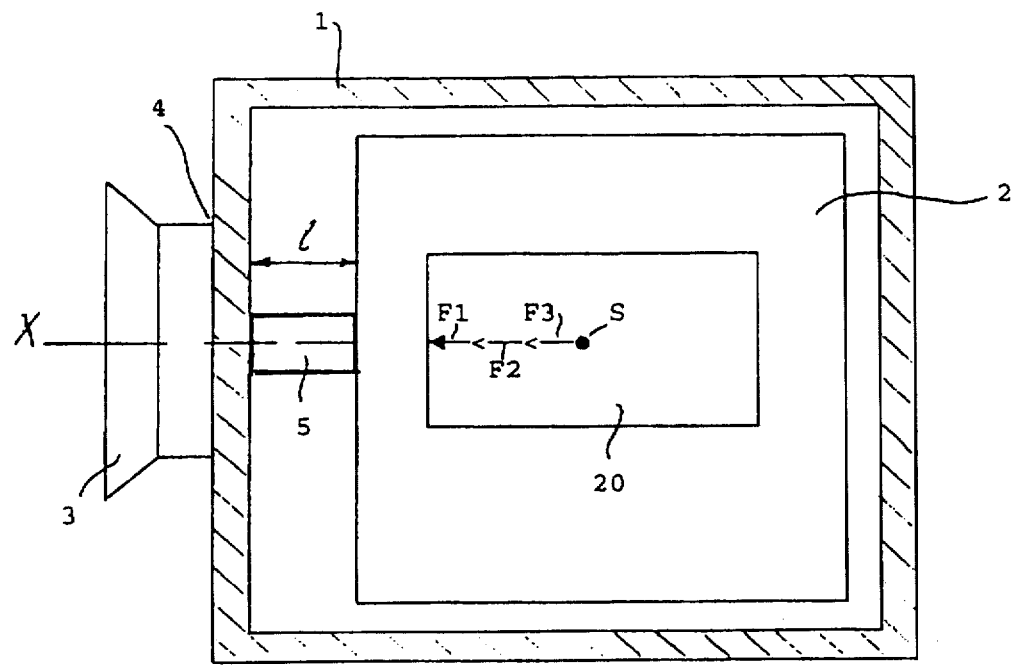
FIG. 1 is a schematic view in partial cross-section through a motion picture camera with an inner camera and a camera housing and a connection element disposed between the inner camera and the camera housing.

FIG. 1 depicts a motion picture camera with a camera housing 1 which is linked by means of a lens mount 4 with a camera lens 3. The camera housing encloses an inner camera 2 which has motor and drive devices [not shown] of a camera mechanism 20 for transport of a motion picture film along a gate which is disposed in an optical axis X of the motion picture camera. Thus, the optical axis X is defined by the lens and gate. A connection element 5, which mechanically links the two major structural components of the motion picture camera, is disposed between the inner camera 2 and the camera housing 1.

As has been explained above, a rigid connection element 5 would certainly provide a constant distance 1 between the inner camera 2 and the camera housing 1 and thus, a constant distance between the lens mount 4 and the gate, past which the motion picture film is moved by the camera mechanism 20; however, all noise and vibrations generated by the camera mechanism would be transferred to the camera housing 1 such that the operation of the motion picture camera is linked with high generation of noise.

A very soft connection element 5 between the camera housing 1 and the inner camera 2 would certainly minimize the transfer of the noise and vibrations generated by the camera mechanism 20, but would result in a significant change in the flange focal length between the lens mount 4 and the gate of the inner camera such that unfocused photographs would result.

In the following for the purposes of the explanation, the camera housing 1 and the inner camera 2 will be assumed to be rigid masses. Moreover, considering first a one-dimensional case, in which the forces acting on the inner camera 2 and the resultant movements of the inner camera 2 relative to the camera housing occur only in the direction of the optical axis X.

In the operation of the motion picture camera, the inner camera 2 is subjected to mechanical vibrations originating from the camera mechanism 20, and from which a variable force $F_1$, which acts on the center of gravity S of the inner camera 2, results. If the entire motion picture camera is moved, the inertial force $F_2$ appears as an additional force as a function of the movement of the motion picture camera on the center of gravity of the inner camera 2. By means of a change in position of the entire motion picture camera, the gravitational component $F_3$, which likewise acts on the center of gravity S of the inner camera, can also change in the direction of the optical axis X.

These different forces $F_1$, $F_2$, and $F_3$ acting on the center of gravity S of the inner camera 2 change with different frequency. Whereas the force $F_1$, which acts on the center of gravity S of the inner camera 2 because of the camera mechanism 20, changes periodically with the operating frequency or the picture frequency of the motion picture camera and its multiple, the forces $F_2$ and $F_3$ change less frequently.

If the connection element 5 disposed between the inner camera 2 and the camera housing 1 were infinitely flexible or soft, the force $F_1$, which changes periodically with the operating frequency or the picture frequency of the motion picture camera and its multiple, would be derived exclusively from the inert mass of the inner camera 2. The inner camera 2 would certainly move relative to the camera housing 1, but the force $F_1$ would not be transferred to the camera housing. Thus, the vibrations of the inner camera 2 originating from the camera mechanism 20 would generate no noise on the inner camera 1. With the customary magnitudes of operating forces and masses in motion picture cameras, the relative movement resulting from the force $F_1$, which changes periodically with the operating frequency or the picture frequency and its multiple, the change in the flange focal length l between the lens mount 4 and the gate of the inner camera 2 would be negligibly small.

However, assuming a low rigidity of the noise-insulating connection element 5 between the camera housing 1 and the inner camera 2, the forces acting through the inertial force $F_2$ and through the gravitational component $F_3$ in the direction of the optical axis would cause movements far greater in magnitude between the inner camera 2 and the camera housing 1, and thus, force $F_2$ and force $F_3$ change the flange focal length l between the lens mount 4 and the gate of the inner camera 2 in unacceptable magnitudes. To prevent this, the noise-insulating connection element 5 between the camera housing 1 and the inner camera 2 must be so rigid that the relative movements between the inner camera 2 and the camera housing 1 become negligible.

The noise-insulating connection element 5 disposed between the camera housing 1 and the inner camera 2 is thus designed such that it acts as a very soft spring relative to the higher-frequency force attributable to the camera mechanism 20 which varies with the operating frequency or the picture frequency or a multiple of this frequency, but it acts as a very stiff spring relative to the lower-frequency inertial and gravitational forces. As a result, the connection element 5 has an adequately high inherent rigidity such that the inertial and gravitational forces $F_2$ and $F_3$ cause only a negligibly small relative movement between the inner camera 2 and the camera housing 1. At the same time, the frequencies of these force excitations are so low that they generate no perceptible noise.

Additionally, the linear expansion along length l of the noise-insulating connection element 5 is dynamically controllable. This control is designed such that the length l of the active noise-insulating connection element 5 is changed according to the relative movement between the inner camera 2 and the camera housing 1 as with an infinitely soft connection and would occur upon excitation by the force $F_1$ caused by the camera mechanism 20 changing with the operating frequency or the picture frequency. Because of this control, the inner camera 2 can vibrate in dynamic equilibrium between the inertial mass and the excitation force $F_1$ without the force $F_1$ being transferred to the camera housing 1. Thus, the force $F_1$, occurring periodically with the operating frequency or the picture frequency, causes no noise-exciting vibrations on the camera housing 1 and at most negligibly small changes in the flange focal length between the lens mount 4 on the camera housing 1 and the gate of the inner camera 2.

Figure 2:
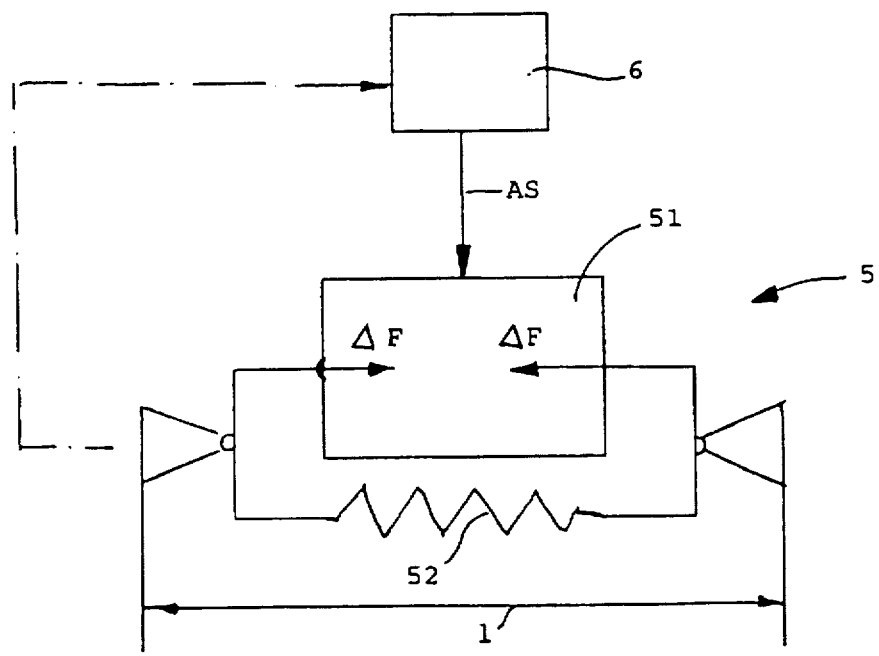
FIG. 2 is a schematic representation of an active noise-insulating connection element with spring and converter elements connected parallel to each other.

FIG. 2 depicts an embodiment of a dynamically controllable noise-insulating connection element 5, which is referred to in the following as an active noise-insulating connection element 5. In this arrangement, a converter element 51 is utilized which is electromagnetic, electrostrictive, magnetostrictive, piezoelectric, to vary in its dimensions through the action of a control signal. The converter element 51 is made of any suitable structure. One suitable converter is a piezoelectric manometer. The converter is connected parallel to a spring element 52 with a predefined rigidity or spring constant C. The spring constant C is adequately high such that the inertial force $F_2$ and the gravitational force $F_3$ cause only very small changes in length, which result in no impairment of the flange focal length and thus of the image output of the motion picture camera.

Compared to the spring element 52, the converter element 51 has only very low inherent rigidity. Through appropriate control of the converter element 51 with a control signal AS which is issued by a control circuit 6, an additional force component ΔF is applied, which results in a change in length of the spring element 52 such that the total length l of the active noise-insulating connection element 5 is changed to insulate the camera housing 1 from the vibration of the camera mechanism 20. The control circuit, is connected with at least one sensor element, and contains a filter, which passes on only the higher-frequency components of the sensor signal or signals. The control also includes an evaluation circuit, which generates a control signal for the converter element of the active noise-insulating connection element. The converter element forces the spring element 52 to compensate for the vibration from the camera mechanism 20 by making negligible changes in the lengths of the spring element 52. The changes in the length of the spring element occur with an amplitude and a frequency corresponding to the amplitude and frequency of the vibrations from the camera mechanism 20 or a multiple thereof.

The solution according to the invention starts from the knowledge that the different forces acting on the inner camera change with a different frequency. Thus, the force acting on the inner camera caused by the camera mechanism during operation changes periodically with the operating or picture frequency and its multiple, while the inertial force resulting from an overall movement of the camera as well as the force of gravity which changes due to a change in position of the entire camera act with significantly lower frequencies on the inner camera. The frequency-dependent rigidity of the connection elements between the inner camera and the camera housing acting in the direction of the optical axis enables a selection of the various forces acting on the inner camera and must act, in particular relative to the higher frequency force caused by the camera mechanism, like a very soft spring, but like a very stiff spring relative to the lower frequency inertial and gravitational components.

The high frequency excitation on the inner camera is thus supported primarily against the inertia of the inner camera and only a negligibly small component of force is passed on to the housing. The vibrational amplitudes of the inner camera are so small due to the relatively high frequency of the excitation and the mass of the inner camera that the quality of the recording of images of the camera is not impaired. In contrast, the lower frequency excitation on the inner camera is transferred primarily to the housing. The vibrational amplitudes of the inner camera are also so small due to the highly active rigidity of the connection elements relative to these frequencies that the optical quality of the camera is not impaired. On the other hand, the frequencies are so low that they cause no perceptible noise on the housing.

Thus, an advantageous improvement of the solution according to the invention is characterized in that the noise-insulating connection elements are designed as active connection elements with variably active rigidity. The use of active connection elements enables control of the effective rigidity under consideration of dynamic forces. Preferably the active connection element has an adequately high inherent rigidity and dynamically controllable linear expansion.

The high inherent rigidity of the active noise-insulating connection element assures a negligibly small relative movement between the inner camera and the external camera housing under the action of inertia, which acts motion-dependently on the center of gravity of the inner camera as well as the gravitational component in the direction of the optical axis of the motion picture camera caused by changes in position of the motion picture camera. The dynamic control of the linear expansion of the active noise-insulating connection element permits the inner camera to vibrate in dynamic equilibrium between the inertial mass and the force acting on the inner camera which changes periodically with the operating frequency or the picture frequency without this periodically changing force being transferred to the camera housing, such that no noise-exciting vibrations occur on the camera housing. Preferably the length of the active connection element with frequency-dependent rigidity is changeable such that it corresponds to a relative movement between the inner camera and the camera housing with infinitely soft connection between the inner camera and the camera housing under the action of the force that changes with the picture frequency of the motion picture camera or even-numbered multiple thereof.

This type of control makes it possible for the inner camera to vibrate in dynamic equilibrium between the inherent inertia and the force caused by the camera mechanism and changing periodically with the operating frequency or the picture frequency and its multiple, without this higher-frequency force being transferred to the camera housing. Thus, the higher-frequency force caused by the camera mechanism causes no noise exciting vibrations on the camera housing and the forces acting on the inner camera can also cause only negligible small changes in the flange focal length.

Another variant of the active noise-insulating connection element 5 consists of an electromagnetic, electrostrictive, magnetostrictive, piezoelectric converter with adequately high inherent rigidity or spring constant C. Through dynamic control of the converter element corresponding to the control of the converter element 51 in the embodiment according to FIG. 2, the length of the converter element and with it the total length of the active noise-insulating connection element 5 is changed, without requiring an additional spring element connected parallel to the converter element.

In addition to the embodiments of the active noise-insulating connection element depicted and mentioned, other variants are also possible, such as hydrodynamic connection elements which execute consequent length changes with adequately high inherent rigidity of the higher-frequency, variable force $F_1$ in response to an appropriate control signals. In these embodiments, the connection element with frequency-dependent rigidity is designed as a passive connection element, whose material is of such a nature that it acts as a very soft spring relative to the higher-frequency forces but as a very stiff spring relative to the lower-frequency forces.

Figure 3:
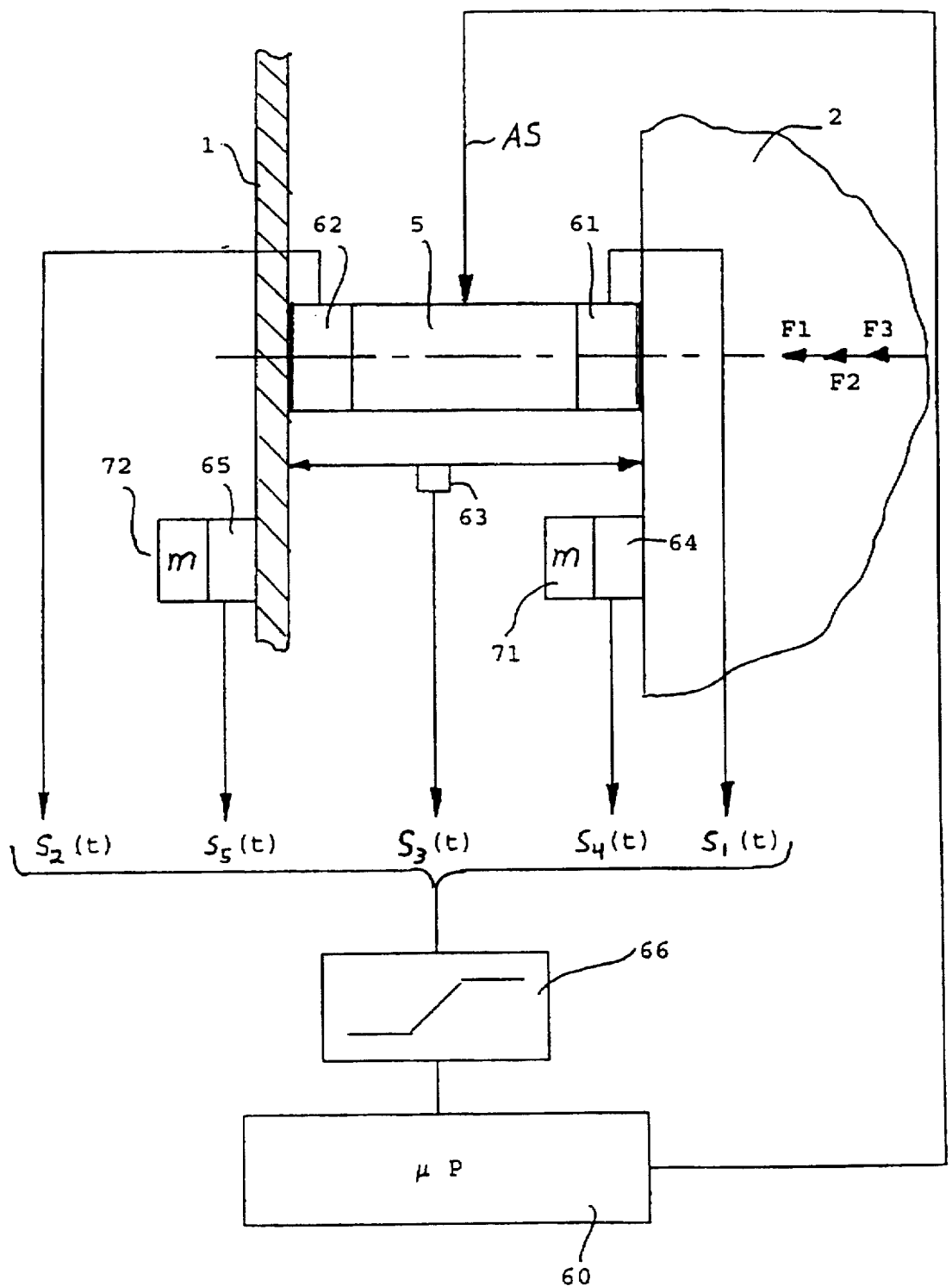
FIG. 3 is a schematic representation of the control circuit connected with an active noise-insulating connection element.

FIG. 3 depicts an exemplary embodiment of the control circuit for the active noise-insulating connection element. The control circuit 6 consists essentially of one or a plurality of force or length measuring sensors 61 through 65, a filter element 66 connected downstream from the sensor signal(s), and a processor 60, which issues the control signal AS according to FIG. 2 via an amplifying element or circuit to the active noise-insulating connection element 5. The sensor element may consist of a force sensor 61 or 62, which has an adequately high inherent rigidity and which detects the interfacing force between the inner camera 2 and the active noise-insulating connection element 5 (force sensor 61) and/or between the active noise-insulating connection element 5 and the camera housing 1 (force sensor 62). The signals output by these sensor elements 61, 62 are issued to the filter element 66 as time-dependent sensor signals $S_1(t)$ or $S_2(t)$.

Alternatively, the inner camera 2 may be coupled via a force sensor 64 with a reference value 71, whereby the force sensor 64 detects the interfacing force between the inner camera 2 and the reference value 71 and outputs it as a time-dependent sensor signal $S_4(t)$. In the same manner, the interfacing force between the camera housing 1 and a reference value 72 can be measured by means of a force sensor 65 and sent via the filter element 66 to the processor 60 as a time-dependent sensor signal $S_5(t)$.

As another alternative, the distance between the inner camera 2 and the camera housing 1, i.e., the length of the active noise-insulating connection element 5 can be detected by means of a length measuring sensor 63, which issues a length-proportional sensor signal $S_3(t)$ to the processor 60 via the filter element 66. Furthermore, the converter element of the active noise-insulating connection element can even be controlled via an appropriate multiplexed circuit for measurement of the force or linear expansion.

One or a combination of a plurality of the above-described sensor signals serves as the input signal for the generation of the control signal AS, whereby the sensor signal $S_n(t)$ is first filtered such that only higher frequencies are included in the signal. The signal issued from the filter element 66 to the processor 60 thus includes no components which are caused by the inertial force $F_2$ or the gravitational force $F_3$.

From the filtered sensor signal the course of the force $F_1$ is simulated in the processor 60 under consideration of the total vibration system through digital simulation of the masses of the inner camera 2, the camera housing 1, and the inherent rigidity of the active noise-insulating connection element 5 and the excitation force $F_1$ is thus calculated from the filtered sensor signal. From this digital simulation of the excitation force $F_1$, the vibration behavior of the entire system is extrapolated for the case that the active noise-insulating connection element 5 has infinitely low rigidity. This extrapolation in turn yields the necessary control of the converter element 51 of the active noise-insulating connection element 5 in the case of the embodiment according to FIG. 2 or a corresponding element which varies in length.

After issuing the control signal AS to the active noise-insulating connection element 5, the interfacing force between the camera housing 1 and the active noise-insulating connection element 5 or between the active noise-insulating connection element 5 and the inner camera 2 is detected and the quality of the adjustment of the active noise-insulating connection element 5 is checked with it. The derivation of the control signal AS for the active noise-insulating connection element 5 from the digitally modeled value of the excitation force $F_1$ can be optimized through multiple repetition of the calculation, whereby preferably the model parameters are varied in each instance by means of an appropriate algorithm such that the vibrations caused by the variable, higher-frequency force $F_1$ are compensated by the active noise-insulating connection element 5 enough that no transfer of the excitation force to the camera housing 1 occurs.

Alternatively to this computer determination of the control signal AS for the active noise-insulating connection element 5 from the sensor signal(s), there exists the possibility of detecting the vibrational movements of the inner camera 2 caused by the camera mechanism 20 specifically using measurement technology and to store this in the processor 60 according to FIG. 3. This measurement technology detection is carried out through very soft suspension of the inner camera 2 and excitation with the higher-frequency force $F_1$ originating from the camera mechanism 20 and, for example, the date is stored in a table memory of the processor 60 for the various camera speeds, types of film, and the like.

The determination of the movement of the inner camera 2 may also be carried out separately from the motion picture camera, by suspending the entire inner camera 2 very softly and measuring its movements in the operational state, i.e., with the camera mechanism 20 running and storing them in memory. Alternatively, the motion picture camera may be designed such that for the duration of the measurement the active noise-insulating connection element 5 is replaced by a very soft spring and the excitation force $F_1$ detected using measurement technology under various operating conditions of the motion picture camera and stored in a table memory of the processor 60. From the movement cycle of the inner camera 2 resulting from the higher-frequency excitation force $F_1$ thus determined, the control signal AS of the active noise-insulating connection element 5 is generated by the processor 60. Even in this embodiment, additional optimization of the control or output of the control signal by the processor 60 to the active noise-insulating connection element 5 during operation of the motion picture camera is possible and useful for adaptive control.

Figure 4:
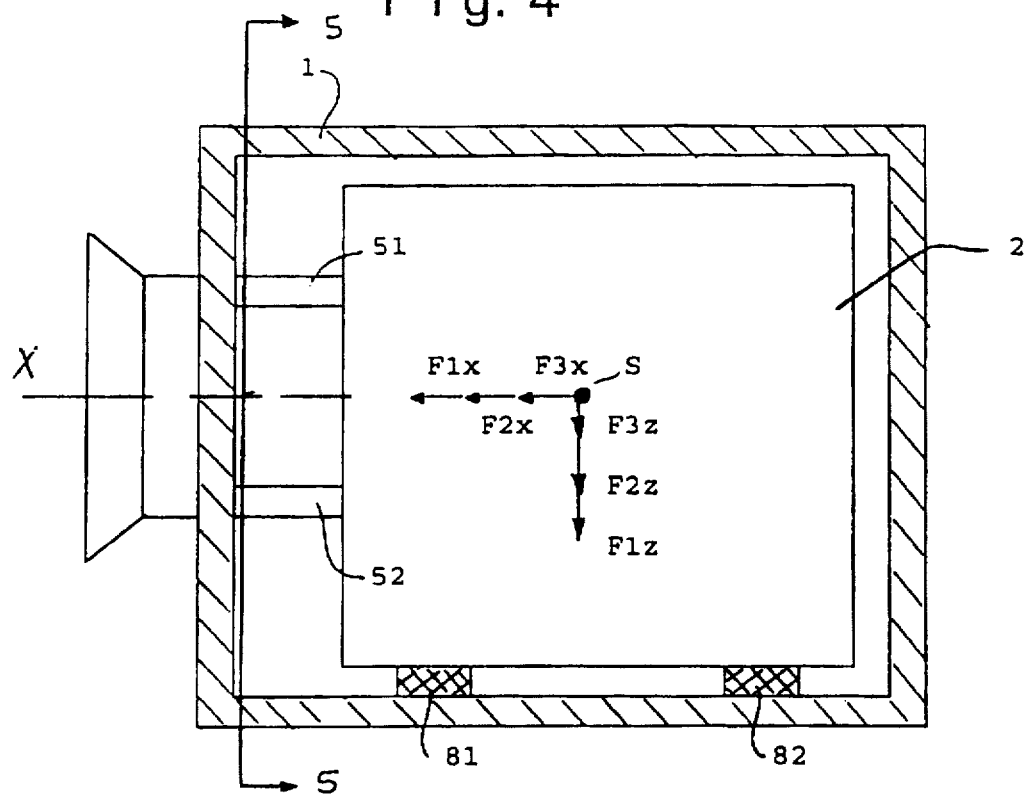
FIG. 4 is a schematic view in partial cross-section through a motion picture camera with an active noise-insulating connection element as well as additional elastic connection elements disposed between an inner camera and a camera housing.
Figure 5:
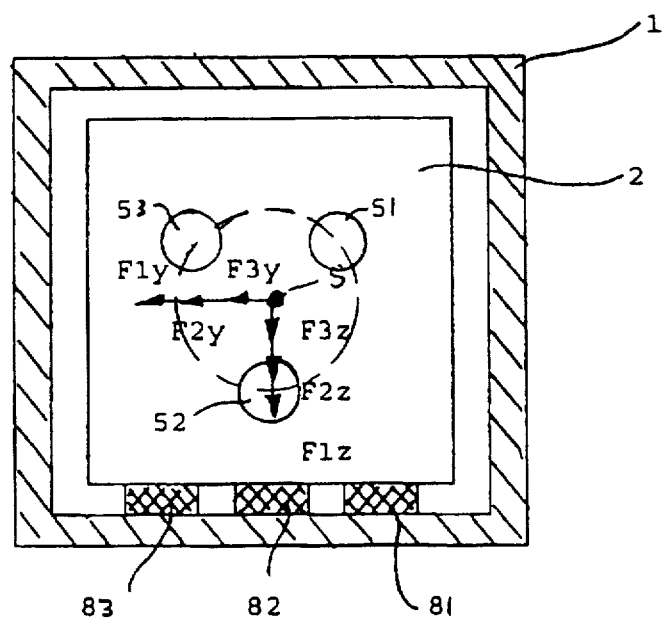
FIG. 5 is a cross-section through the motion picture camera according to FIG. 4 taken along Line 5—5 of FIG. 4.

The solution principle described above using a one-dimensional representation of a motion picture camera is applicable by analogy to the multidimensional demands made on a motion picture camera. FIGS. 4 and 5 depict such a three-dimensional application of the solution principle according to the invention. In this embodiment, the inner camera is linked to the camera housing by means of three active noise-insulating connection elements 51, 52, 53, whose directions of action, i.e. whose variable length axes are disposed parallel to the optical axis X of the motion picture camera. The axes of the three active noise-insulating connection elements 51, 52, 53 are in each instance disposed at an equal distance from the center of gravity S of the inner camera 2, to prevent tipping of the inner camera 2 relative to the camera housing 1.

Moreover, the inner camera 2 is linked with the camera housing 1 by means of additional elastic elements 81, 82, 83, whose rigidity is less than the inherent rigidity of the active noise-insulating connection elements 51, 52, 53. The arrangement of the active noise-insulating connection elements 51, 52, 53 as well as the additional elastic connection elements 81, 82, 83 is designed such that the position of the inner camera 2 relative to the camera housing 1 is at least statically defined in all degrees of freedom of movement of the inner camera 2 relative to the camera housing 1.

The additional elastic connection elements 81, 82, 83 may, for example, form a three-point-mounting of the bottom of the inner camera 2 relative to the bottom of the camera housing. Any other geometric configuration of the additional elastic connection elements 81, 82, 83 may be selected. Here, the additional elastic connection elements 81, 82, 83 may transfer both compressive forces and tension forces such that an additional supporting of the inner camera 2 relative to the camera housing 1 is unnecessary.

Alternatively or in addition to this form of the additional elastic connection elements 81, 82, 83, the arrangement of additional soft connection elements between the inner camera 2 and the camera housing 1 on the sides between the side walls, the back, or the top of the motion picture camera is possible.

In FIGS. 4 and 5, the forces $F_1$, $F_2$, and $F_3$ acting on the center of gravity S of the inner camera 2, i.e., the variable, higher-frequency force $F_1$ attributable to the camera mechanism, the inertial force $F_2$, and the gravitational force $F_3$, are represented in their three force components $F_{nx}$, $F_{ny}$, and $F_{nz}$, whereby the coordinate system has its origin in the center of gravity S of the inner camera 2. The control of the active noise-insulating connection elements 51, 52, 53 occurs in that the components of the force $F_1$ attributable to the vibrations of the camera mechanism, which acts in the direction of the optical axis X, is not transferred to the camera housing 1, and thus, no noise is transferred to the camera housing 1. The components of the inertial force $F_2$ and the gravitational force $F_3$ acting in the direction of the optical axis cause, because of the high inherent rigidity of the active noise-insulating connection elements 51, 52, 53, a negligibly small relative movement of the inner camera 2 relative to the camera housing 1 and thus an only negligibly small change in the flange focal length between the lens mount and the gate.

The components of the higher-frequency excitation force $F_1$, which do not act in the direction of the optical axis X, are supported, because of the low inherent rigidity of the additional elastic connection elements 81, 82, 83, only to a small extent on the camera housing 1, such that the noises also attributable to these forces are not or are only slightly transferred to the camera housing 1. The components of the inertial force $F_2$ and the gravitational force $F_3$ not acting in the direction of the optical axis X do cause a change in length of the additional elastic connection elements 81, 82, 83 and thus a relative movement of the inner camera 2 relative to the camera housing 1; these relative movements result, however, in no changes in the flange focal length between the lens mount and the gate. This is true because elements 81, 82, 83 allow relative movement between the camera housing 1 and inner camera 2 in directions other than the direction of the optical axis X, and the movement between the camera housing 1 and inner camera along the optical axis X is controlled by the active connection elements 51, 52, 53.

It also falls within the framework of the arrangement according to the invention to place additional active noise-insulating connection elements between the inner camera 2 and the camera housing 1 in the directions of action which do not run parallel to the optical axis X. Thus, mechanical stability can be assured with simultaneous insulation against vibration in the other axes of the three-dimensional coordinate system.

Figure 6:
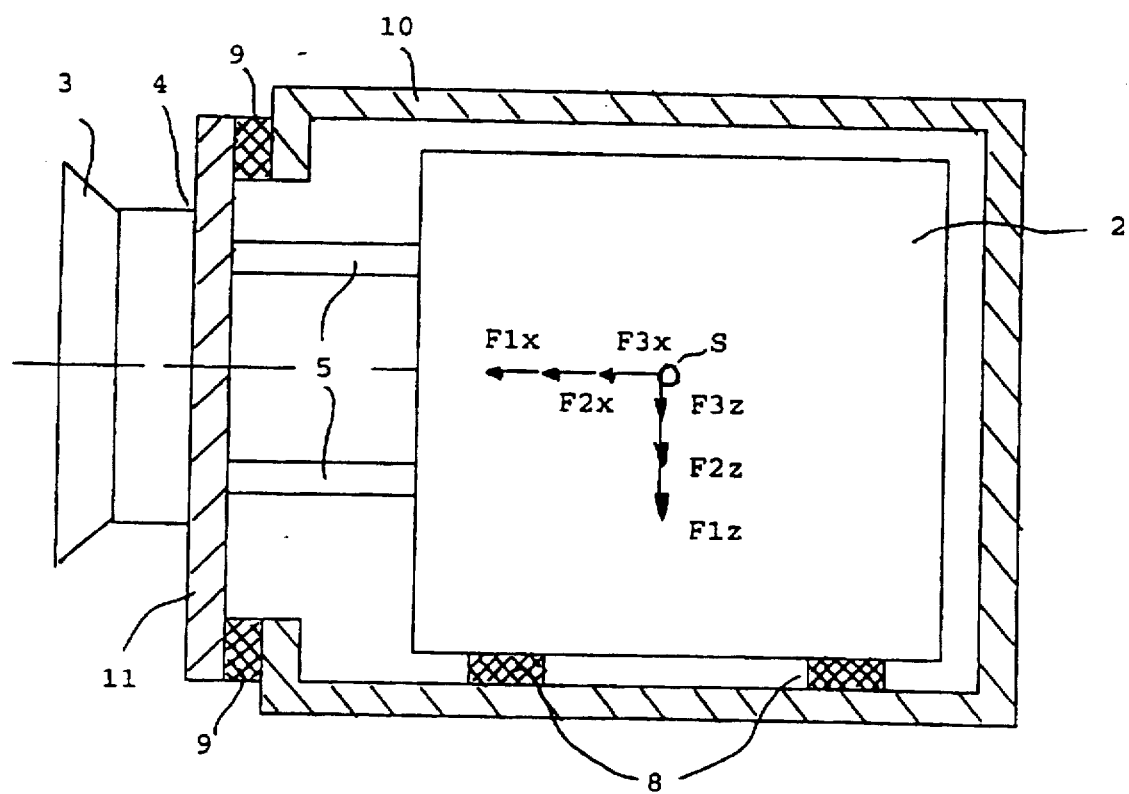
FIG. 6 is a schematic view in partial cross-section through a motion picture camera with a subdivided camera housing.

FIG. 6 depicts a preferred embodiment for a noise-insulated motion picture camera in which the camera housing 1 is subdivided into a primary housing 10 and a carrier plate 11, whereby the lens mount 4 of the lens 3 is installed on the carrier plate 11. The primary housing 10 and the carrier plate 11 are linked to each other via one or a circumferentially arranged plurality of relatively soft elastic connection elements 9.

The inner camera 2 is linked to the carrier plate 11 by at least one but preferably three active noise-insulating connection elements 5, whose directions of action run parallel to the optical axis X. The inner camera 2 is linked to the primary housing 10 by a plurality of relatively soft elastic connection elements 8 such that there is an at least statically defined coordination of the inner camera 2 relative to the primary housing 10 or the camera housing 1.

The active noise-insulating connection elements 5 are in this embodiment of a noise-insulated motion picture camera controlled such that the components of the variable excitation force $F_1$ acting in the direction of the optical axis are not transmitted to the carrier plate 11 and thus transfer no noise originating from the camera mechanism to the carrier plate 11.

The high inherent rigidity of the active noise-insulating connection element 5 assures at the same time that components of the inertial force $F_2$ and the gravitational force $F_3$ which are active in the direction of the optical axis X cause only a negligibly small relative movement between the inner camera 2 and the carrier plate 11 such that the flange focal length between the lens mount 4 and the gate disposed inside the inner camera 2 remains to a large degree constant. The above referenced embodiments calculate the force $F_1$ considering the vibration system which includes the masses of the inner camera 2, the camera housing 1.

Thus, an improvement of the noise and vibrations insulation between the inner camera bearing the noise-generating parts of the motion picture camera and the camera housing which maintains a constant flange focal length between the lens plane and the image plane of the motion picture camera at the same time is disclosed utilizing active noise-insulating connection elements. With it, readjustments or the use of supplemental position-compensating devices are not required, such that simple operation of the motion picture camera with high picture quality is assured. While embodiments and applications of this invention have been shown and described, it would be apparent to those skilled in the art that many modifications are possible without departing from the inventive concepts herein. It is, therefore, to be understood that within the scope of the appended claims, this invention may be practiced otherwise than as specifically described.

The disclosure of attached Federal Republic of Germany patent application 44 43 255.0, filed on Nov. 11, 1994 is incorporated fully herein by reference. Priority of this Federal Republic of Germany application is claimed.

What is claimed is:

1. A motion picture camera comprising an inner camera, a camera mechanism that generates noise, a camera housing, a lens carrier attached to the camera housing, a photographic lens mounted on the lens carrier in an optical axis of the motion picture camera, and at least one noise-insulating connection element disposed between the inner camera and the camera housing, and said at least one noise-insulating connection element being disposed parallel to the optical axis of the motion picture camera and has frequency-dependent rigidity with a higher rigidity relative to lower-frequency forces and a lower rigidity relative to higher-frequency forces.

2. The motion picture camera according to claim 1 wherein the noise-insulating connection element comprises an active connection element with variably active rigidity.

3. The motion picture camera according to claim 1 wherein the noise-insulating connection element has high inherent rigidity and dynamically controllable linear expansion.

4. The motion picture camera according to claim 1 wherein the length of the connection element with frequency-dependent rigidity is variable such that it corresponds to a relative movement between the inner camera and the camera housing with an infinitely soft connection between the inner camera and the camera housing under the action of a force corresponding to a periodically changing picture frequency of the motion picture camera.

5. The motion picture camera according to claim 1 wherein the low frequency force is an inertial force, the noise-insulating connection element has a length, and the noise-insulating connection element comprises a spring element with a spring constant, which permits only slight changes in length with the action of the inertial force as a function of either and both movement of the motion picture camera on a center of gravity of the inner camera and on a change in the position of the entire motion picture camera, a converter element disposed parallel to the spring element, the converter element having a low inherent rigidity compared to the spring element, and the converter element being controllable such that the total length of the noise-insulating connection element is variable.

6. The motion picture camera according to claim 5 wherein the converter element is selected from the group of converters comprising an electromagnetic, electrostrictive, magnetostrictive, and piezoelectric converter.

7. The motion picture camera according to claim 1 wherein the noise-insulating connection element is selected from the group comprising electromagnetic, electrostrictive, magnetostrictive, piezoelectric converter element with high inherent rigidity, whose length and thus the length of the entire noise-insulating connection element is variable through appropriate control.

8. The motion picture camera according to claim 1 further comprising a control circuit and wherein the noise-insulating connection element is linked to the control circuit, the control circuit including at least one sensor element, a filter element which passes only the higher-frequency force components from the sensor signal, and an evaluation circuit which generates a control signal for a converter element of the noise-insulating connection element.

9. The motion picture camera according to claim 8 wherein the sensor element comprises a force sensor with high inherent rigidity, and the sensor detects an interfacing force between the inner camera and the noise-insulating connection element.

10. The motion picture camera according to claim 8 wherein the sensor element comprises a force sensor with high inherent rigidity, and the sensor detects an interfacing force between the noise-insulating connection element and the camera housing.

11. The motion picture camera according to claim 8 wherein the sensor element comprises a force sensor with high inherent rigidity, and the sensor detects an interfacing force between the camera housing and a reference value.

12. The motion picture camera according to claim 8 wherein the sensor element comprises a force sensor with high inherent rigidity, and the sensor detects an interfacing force between the inner camera and a reference value.

13. The motion picture camera according to claim 8 characterized in that the sensor element consists of a length measuring sensor for detecting a distance between the inner camera and the camera housing or a length of the noise-insulating connection element.

14. The motion picture camera according to claim 8 wherein the evaluation circuit comprises a processor, which receives an output signal from the filter element, and the output signal is a function of changing forces acting on the inner camera, a vibration system including the inner camera mass, the camera housing mass, and the inherent rigidity of the noise-insulating element, and vibration behavior of the vibration system being extrapolated under the assumption that the noise-insulating element has infinitely soft rigidity.

15. The motion picture camera according to claim 14 wherein the processor comprising an amplifier circuit which issues a control signal to the converter element.

16. The motion picture camera according to claim 8 wherein the control circuit comprises a processor, the control signal issued by the processor for the converter element of the noise-insulating connection element is determined by detection of the vibration movement of the inner camera by the sensor elements with soft suspension and excitation with a force acting on the inner camera and the force and the control signal periodically changing with the operating and picture frequency or its multiple and is stored in a table memory.

17. The motion picture camera according to claim 8 wherein after output of the control signal to the noise-insulating connection element, an interfacing force is detected and the accuracy of the adjustment of the noise-insulating connection element is checked.

18. The motion picture camera according to claim 8 wherein derivation of the control signal for the noise-insulating connection element is optimized from a digitally modeled value of an excitation force through multiple repetition of the calculation.

19. The motion picture camera according to claim 18 wherein model parameters are varied using an algorithm and the control signal is varied such that vibrations caused by the variable, higher-frequency force are compensated for by the noise-insulating connection element enough that transfer of the excitation force to the camera housing is inhibited.

20. The motion picture camera according to claim 1 wherein the noise-insulating connection comprises a converter element which includes a multiplexed circuit for sensing force or length measurements.

21. The motion picture camera according to claim 1 further comprising a control circuit with a processor and wherein movement of the inner camera is detected in its operational state such that for the duration of the detection the noise-insulating connection element is replaced by a soft spring and the excitation force is detected under various operating conditions of the motion picture camera and is stored in table memory of the processor.

22. The motion picture camera according to claim 1 wherein the movement of the inner camera occurs separated from the camera housing such that the inner camera is softly suspended and its movements are measured in an operational state and stored in memory.

23. The motion picture camera according to claim 1 wherein the inner camera is linked to the camera housing by three active noise-insulating connection elements with variable length axes running parallel to the optical axis of the motion picture camera, and each of the active noise-insulation connection elements are disposed at an equal distance from a center of gravity of the inner camera.

24. The motion picture camera according to claim 1 further comprising a plurality of elastic elements whose rigidity is less than the inherent rigidity of the noise-insulating connection element and wherein the inner camera and the camera housing are linked by the elastic elements and the noise-insulating connection element, and the elastic elements are disposed such that the position of the inner camera is statically determined relative to the camera housing in multiple degrees of freedom.

25. The motion picture camera according to claim 1 further comprising at least one noise-insulating connection element disposed between the inner camera and the camera housing in a direction that is not parallel to the optical axis.

26. A noise-insulated motion picture camera comprising:
   an inner camera;
   a camera mechanism attached to the inner camera, the camera mechanism generating noise and vibration during operation;
   a camera housing enclosing the inner camera and camera mechanism;
   a lens carrier with a lens mounted on the camera housing; the lens and the inner camera defining an optical axis;
   a noise-insulating connection element disposed between the camera housing and the inner camera; and
   the noise-insulating connection element comprising a converter element capable of changing length to inhibit noise and vibration created by the camera mechanism from being transmitted to the camera housing, and a spring in parallel with the converter element.

27. A motion picture camera comprising: an inner camera, a camera mechanism to operate the inner camera, the inner camera and camera mechanism housed inside a camera housing having a primary housing and a carrier plate, a lens mounted on the carrier plate, a plurality of soft elastic connection elements linking the primary housing to the carrier plate, and at least one active noise-insulating connection element disposed to absorb vibration and noise in the direction of an optical axis of the camera.

28. The camera according to claim 28 further comprising a plurality of soft elastic connection elements linking the inner camera to the primary housing.

* * * * *